United States Patent [19]

Ezze

[11] Patent Number: 5,779,282
[45] Date of Patent: Jul. 14, 1998

[54] EXHAUST BALL SEAL

[75] Inventor: Robert James Ezze, Lansing, Mich.

[73] Assignee: General Motors Corporation, Detroit, Mich.

[21] Appl. No.: 585,060

[22] Filed: Jan. 11, 1996

[51] Int. Cl.$^6$ .................................................. F16L 27/06
[52] U.S. Cl. ........................ 285/261; 285/267; 285/368; 285/270; 277/178; 277/183
[58] Field of Search ..................... 285/41, 261, 267, 285/268, 263, 271, 270, 266, 368; 277/178, 183, 207 A

[56] References Cited

U.S. PATENT DOCUMENTS

| | | | |
|---|---|---|---|
| 1,402,545 | 1/1922 | Springborn | 285/268 X |
| 1,949,055 | 2/1934 | Lambie | 285/261 X |
| 2,459,389 | 1/1949 | Newman | 285/261 X |
| 2,907,593 | 10/1959 | De Phillips | 285/271 X |
| 2,922,663 | 1/1960 | Wolf | 285/9 |
| 3,276,695 | 10/1966 | Heygate | 285/271 X |
| 3,477,748 | 11/1969 | Tinsley | 285/267 |
| 4,097,071 | 6/1978 | Crawford et al. | 285/94 |
| 4,182,121 | 1/1980 | Hall | 60/313 |
| 4,188,784 | 2/1980 | Hall | 60/323 |
| 4,277,092 | 7/1981 | Viers | 285/263 |
| 4,516,782 | 5/1985 | Usher | 277/1 |
| 4,570,440 | 2/1986 | Doran | 60/322 |
| 4,583,768 | 4/1986 | Aoki et al. | 285/41 |
| 4,641,861 | 2/1987 | Scoboria | 285/39 |
| 4,643,458 | 2/1987 | Aamar | 285/62 |
| 4,762,330 | 8/1988 | Lonne et al. | 277/230 |
| 4,863,200 | 9/1989 | Brandener | 285/234 |
| 4,871,181 | 10/1989 | Usher et al. | 277/229 |
| 4,928,998 | 5/1990 | Brandener | 285/49 |
| 5,065,493 | 11/1991 | Ozora | 29/505 |
| 5,217,261 | 6/1993 | DeWitt et al. | 285/332.2 |
| 5,393,108 | 2/1995 | Kerr | 285/368 |
| 5,524,906 | 6/1996 | Rackov et al. | 285/368 |
| 5,558,344 | 9/1996 | Kestley et al. | 285/368 X |

*Primary Examiner*—Terry Lee Melius
*Assistant Examiner*—Heather Shackelford
*Attorney, Agent, or Firm*—Anthony Luke Simon

[57] ABSTRACT

An exhaust ball seal comprising: a first flange on an exhaust manifold having first and second first flange ears on either side of an exhaust port; an annular seal having a substantially flat seat on a first axial end, a peripheral shoulder on the first axial end proximate to the flat seat and a convex ball seat on a second axial end; a retainer plate having first and second retainer plate ears on either side of a central opening fitting over the seal and an inner lip engaging the peripheral shoulder; a pipe assembly including: (a) a concave ball seat surface engaging the convex ball seat surface of the seal, (b) a second flange, mounted to a pipe, having first and second second flange ears on either side of the pipe; and first and second retainers passing through the second flange ears and threadably engaging the first flange ears wherein each of the first and second retainers has a retaining shoulder proximate to the first flange wherein the retaining shoulders sandwich the retainer plate ears to the first flange, positively retaining the retainer plate to the first flange and ensuring that the seal is seated in the first flange.

5 Claims, 1 Drawing Sheet

1

EXHAUST BALL SEAL

BACKGROUND OF THE INVENTION

FIG. 1 illustrates an example prior art flexible exhaust coupling of the type disclosed in U.S. Pat. No. 4,097,071, assigned to the assignee of this invention. The flexible exhaust coupling provides flexible connection between high temperature exhaust pipes 20 and 24. The coupling includes seal flange 32 welded to pipe 20 allowing end 34 of pipe 20 to extend freely past the seal flange 32. Seal 42 fits over the free end 34 and has a convex surface to match the concave inner surface of flared end 35 of pipe 24. Flared end 35 extends freely from the flange 36 welded to pipe 24.

The unit is held together by bolts 50 and 52 that extend through holes 54 and 56 on the flange 36 and threadably engage the threaded holes 62 and 63 on the seal flange 32. To allow flexibility, springs 68 and 73 interface between the flange 36 and the heads of the bolts 50 and 52, spring biasing the flange 36 in the direction toward seal flange 32. The springs 68 and 73 maintain force on the pipe 24, sandwiching seal 42 between flared end 35 of pipe 24 and the seal flange 32 while allowing ball-and-socket type relative movement between pipes 20 and 24.

SUMMARY OF THE PRESENT INVENTION

It is an object of this invention to provide an exhaust ball seal in accordance with claim 1.

Advantageously, this invention provides an exhaust ball seal suitable for coupling an exhaust pipe to an engine exhaust manifold.

Advantageously, this invention provides an exhaust ball seal that provides a direct hold-down force between the seal and an engine manifold. The direct hold-down force on the seal is provided by a retainer plate having an inner lip engaging a shoulder of the seal, holding the seal in place against a flange of the manifold exhaust port. The retainer plate is in turn held down by retaining structures having shoulders maintaining the retainer plate against the flange. Through the structure that provides the direct hold-down force, this invention ensures that the seal is properly seated to the engine manifold during assembly and thereafter maintained properly sealed.

Advantageously, in a preferred example, this invention provides an exhaust ball seal comprising: a first flange on an exhaust manifold having first and second first flange ears on either side of an exhaust port; an annular seal having a substantially flat seat on a first axial end, a peripheral shoulder on the first axial end proximate to the flat seat and a convex ball seat on a second axial end; a retainer plate having first and second retainer plate ears on either side of a central opening fitting over the seal and an inner lip engaging the peripheral shoulder; a pipe assembly including: (a) a concave ball seat surface engaging the convex ball seat surface of the seal, (b) a second flange, mounted to a pipe, having first and second second flange ears on either side of the pipe; and first and second retainers passing through the second flange ears and threadably engaging the first flange ears wherein each of the first and second retainers has a retaining shoulder proximate to the first flange wherein the retaining shoulders sandwich the retainer plate ears to the first flange, positively retaining the retainer plate to the first flange and ensuring that the seal is seated in the first flange.

BRIEF DESCRIPTION OF THE DRAWINGS

The present invention will now be described by way of example with reference to the following drawings in which.

DETAILED DESCRIPTION OF THE INVENTION

Figure 1:
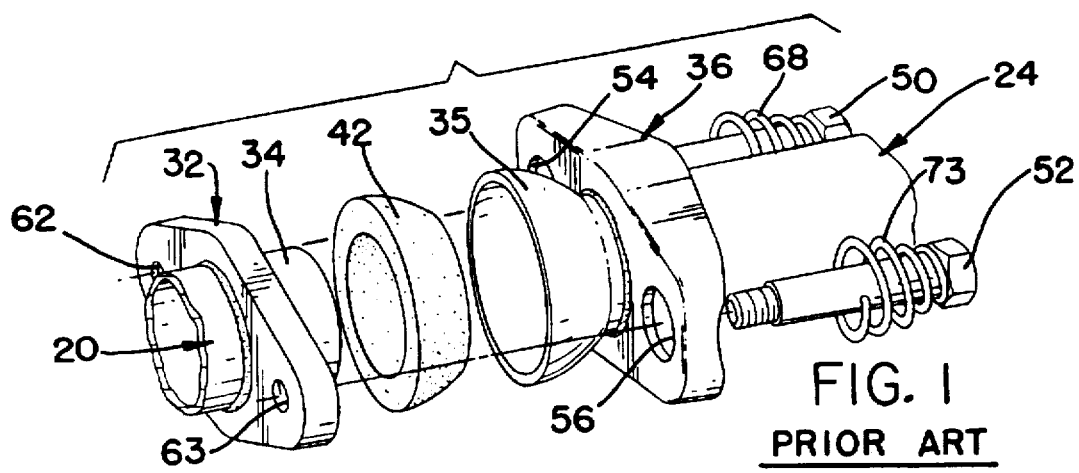
FIG. 1 illustrates an example prior art exhaust ball seal.
Figure 2:
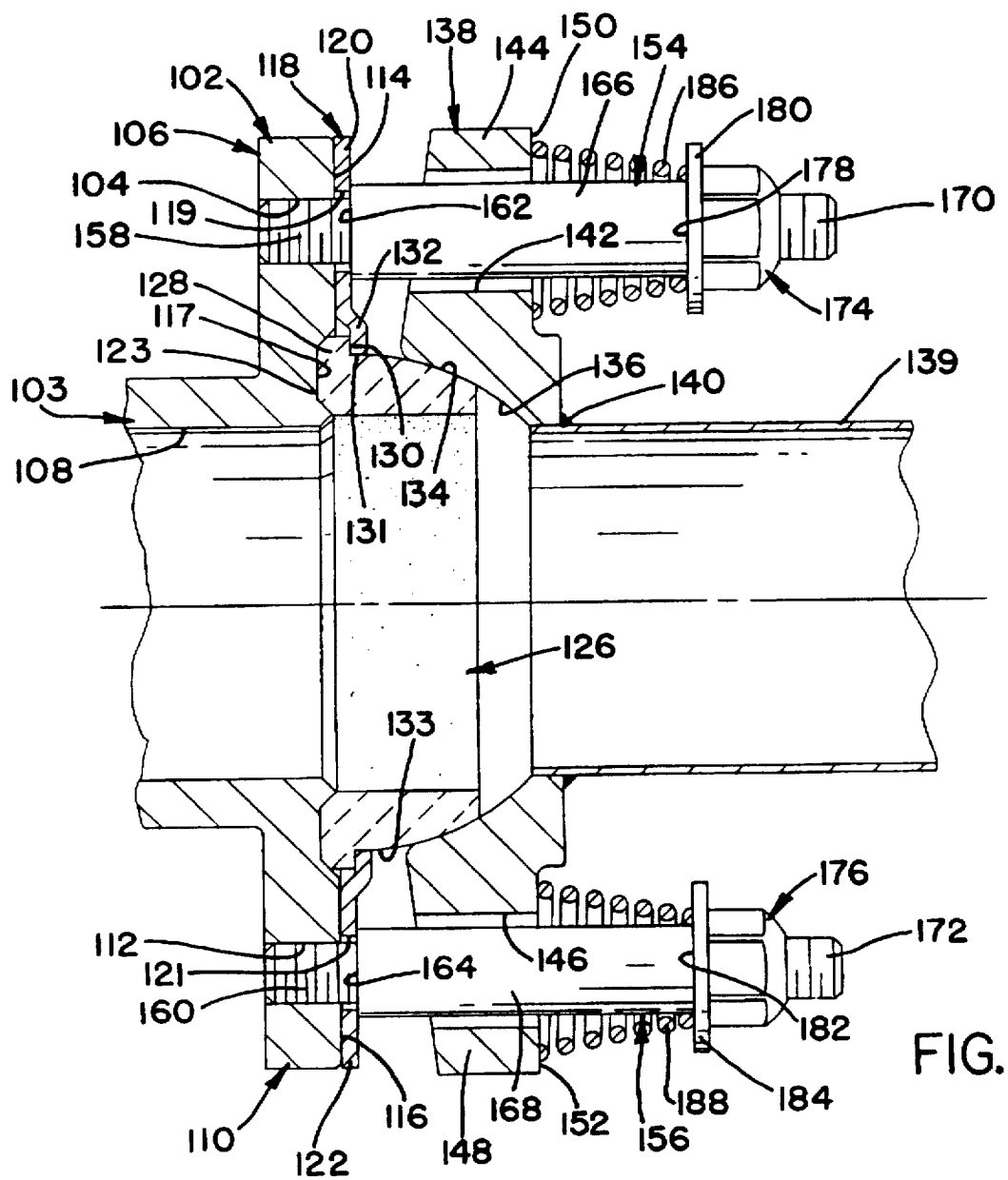
FIG. 2 illustrates an example exhaust ball seal according to this invention.

Referring now to FIG. 2, flange 106 contains a central opening 108 that serves as the exhaust port for internal an combustion engine exhaust manifold 103. The manifold 103, not shown in detail, may be any type of suitable exhaust manifold known to those skilled in the art including a manifold fabricated by casting, a manifold fabricated from stamped metal or a manifold fabricated in any other known manifold fabrication technique. The flange 106 has first and second ears 102 and 110 on opposite sides of the exhaust port 108 and each ear contains a threaded hole 104, 112 (i.e., with respect to the ears 102 and 110, flange 106 is similar in shape to flange 32, FIG. 1). At the end of exhaust port 108, flange 102 has an annular recessed seat 117 coaxial with the opening of the exhaust port 108. Seat 117 receives the flat axial end 123 of vermiculite seal 126. Located at the flat axial end 123 of seal 126 is a peripheral shoulder 128 having a seat 130 facing opposite the flat axial end 123. The other end of seal 126 has an outer convex surface 134 for engaging the inner concave surface 136 of flange 138 to provide a ball-and-socket type joint.

Retainer plate 118 has first and second ears 120 and 122 (i.e., matching the shape of flange 106) seated on seats 114 and 116 of manifold flange 106 with openings 119 and 121 aligned with the threaded holes 104 and 112 in the manifold flange 106. The retainer plate 118 has a central opening 131 engaging the outer peripheral surface 133 of the seal 126 through a friction fit. At the perimeter of the opening 131, retainer plate 118 has a lip 132 formed in the plate 118 so that it is axially displaced from ears 120, 122. Lip 132 seats on the shoulder seat 130 of the seal 126.

The ears 120 and 122 of the retainer plate 118 are maintained in place by the shoulders 162 and 164 of the studs (retainers) 154 and 156 having ends 158 and 160, extending through openings 119 and 121 and threaded into the threaded holes 104 and 112 in the flange 106. The openings 119 and 121 each have a diameter greater than that of stud ends 158 and 160 but less than that of stud bodies 166 and 168. The shoulders 162 and 164 of the studs 154 and 156 sandwich the ears 120 and 122 of the retainer plate 118 to the flange 106 providing direct positive assurance that plate 118 is seated against flange 106. With the plate 118 maintained in place, its inner lip 132 seated against shoulder seat 130 of the seal 126 ensures that the seal 126 is seated in seal seat 117 of the flange 106. In this manner the seal is positively held in place and does not rely on force between the flange 138 and the convex surface 134 of the seal to maintain the flat end 123 of the seal seated in the seat 117. This positive assurance of plate 118 held in place by studs 154 and 156 prevents unseating of seal seat end 123 from seat 117.

Flange 138 is affixed to pipe 139 by weld 140. Flange 138 has first and second ears 144 and 148 each having an opening 142 and 146 aligned with openings 104, 112 of flange 106 through which stud bodies 166 and 168 extend. Each stud 154 and 156 has a protruding end 170 and 172 that is threaded and that receives a nut 174, 176 threadably engaged thereon. Each nut 174, 176 has a shoulder 180, 184 forming a spring seat 178, 182. Each ear 144, 148 of the flange 138 includes a spring seat 150, 152 and the nuts 174,176, sandwich springs 186 and 188 between the spring seats 150, 152 of the flange 138 and the seats 178 and 182 of the nuts 174 and 176, as shown. The springs 186 and 188 maintain force against the flange 138 in the direction of flange 106 ensuring engagement of the ball and socket joint between convex surface 134 of seal 126 and concave surface 136 of flange 138 while allowing flexing of the joint to isolate engine vibration and/or allow alignment between the pipe 139 and the exhaust port 108.

While shown with studs 154 and 156, the assembly may alternatively be held in place by bolts with shoulders similar to shoulders 162 and 164 of studs 154 and 156 and bolt heads forming shoulders performing the functions of shoulders 178 and 182 of nuts 174 and 176.

The seal 126 may include a tubular metal lining fitted within the interior surface of seal 126 and extending a short distance into flange 106 engaging the cylindrical surface of exhaust port 108 to ensure alignment of the seal axis with the axis of exhaust port 108.

To provide uniform loading of the shoulder seat 130 of seal 126, the retainer plate 118 may be fabricated from spring steel with a natural bow causing the retainer ears 120, 122 to bow in the direction towards flange 138 when the studs 154 and 156 are removed. When the studs 154 and 156 are installed, the shoulders 162 and 164 maintain the retainer plate 118 substantially flat as shown in FIG. 2. This bow helps distribute the loading force of the lip 132 of the retainer plate 118 around the entire annular surface of the shoulder seat 130.

I claim:

1. An exhaust connection comprising:

a first flange on an exhaust manifold having first and second first flange ears on either side of an exhaust port;

an annular seal having a substantially flat seat on a first axial end, a peripheral shoulder extending radially outwardly from the first axial end and a convex ball seat on a second axial end;

a retainer plate having first and second diametrically opposed retainer plate ears located radially exterior of a central opening fitting over the seal and a lip extending radially inwardly and engaging the peripheral shoulder;

a second flange, mounted to a pipe, having first and second second flange ears on either side of the pipe and a concave ball seat surface engaging the convex ball seat surface of the seal; and first and second retainers passing through the second flange ears and threadably engaging the first flange ears wherein each of the first and second retainers has a retaining shoulder proximate to the first flange wherein the retaining shoulders sandwich the retainer plate ears to the first flange, positively retaining the retainer plate to the first flange and ensuring that the seal is seated in the first flange.

2. An exhaust connection according to claim 1, wherein each retainer plate ear has a retainer plate ear hole and each second flange ear has a second flange ear hole, wherein each retainer plate ear hole and each second flange ear hole is aligned with a first flange ear hole.

3. An exhaust connection according to claim 1, wherein each of the first and second retainers comprises a stud having first and second threaded ends and a body portion having a first diameter greater than a second diameter of each of the first and second threaded ends.

4. An exhaust connection comprising:

a first flange on an exhaust manifold having first and second first flange ears on either side of an exhaust port;

an annular seal having a substantially flat seat on a first axial end, a peripheral shoulder extending radially outwardly from the first axial end and a convex ball seat on a second axial end;

a retainer plate having first and second diametrically opposed retainer plate ears located radially exterior of a central opening fitting over the seal and a lip extending radially inwardly and engaging the peripheral shoulder;

a pipe assembly including:

(a) a concave ball seat surface engaging the convex ball seat surface of the seal, (b) a second flange, mounted to a pipe, having first and second second flange ears on either side of the pipe; and first and second retainers passing through the second flange ears and threadably engaging the first flange ears wherein each of the first and second retainers has a retaining shoulder proximate to the first flange wherein the retaining shoulders sandwich the retainer plate ears to the first flange, positively retaining the retainer plate to the first flange and ensuring that the seal is seated in the first flange.

5. An exhaust connection comprising:

an exhaust port flange;

a pipe unit having a pipe flange;

an annular seal seated in the exhaust port flange and including a radially outwardly extending annular shoulder;

a retainer plate having a central opening surrounding the annular seal and including a lip extending radially inwardly and engaging the annular shoulder;

a first retainer having a first retaining shoulder in contact with the retainer plate; and a second retainer having a second retaining shoulder in contact with the retainer plate, wherein the first and second retainers maintain the retainer plate against the exhaust port flange between the exhaust port flange and the pipe flange, wherein the annular seal remains properly seated in the exhaust port flange.

* * * * *